US011037344B1

(12) United States Patent
Croom et al.

(10) Patent No.: US 11,037,344 B1
(45) Date of Patent: *Jun. 15, 2021

(54) USER CONTENT PRESENTATION BASED ON STRENGTH OF RELATIONSHIP

(71) Applicant: Twitter, Inc., San Francisco, CA (US)

(72) Inventors: Charles Croom, San Francisco, CA (US); Patrick Henry Sullivan Ewing, San Francisco, CA (US)

(73) Assignee: Twitter, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/102,620

(22) Filed: Aug. 13, 2018

Related U.S. Application Data

(63) Continuation of application No. 14/507,826, filed on Oct. 6, 2014, now Pat. No. 10,049,472.

(51) Int. Cl.
  *G06T 11/20* (2006.01)
  *H04L 29/08* (2006.01)
  *G06Q 50/00* (2012.01)

(52) U.S. Cl.
  CPC ............ *G06T 11/206* (2013.01); *G06Q 50/01* (2013.01); *H04L 67/22* (2013.01)

(58) Field of Classification Search
  CPC ....... G06T 11/206; G06Q 50/01; H04L 67/22; H04L 63/065; H04L 63/102
  USPC ......................................................... 345/440
  See application file for complete search history.

(56) References Cited

U.S. PATENT DOCUMENTS

| 9,122,989 | B1 | 9/2015 | Morris et al. | |
|---|---|---|---|---|
| 2012/0102130 | A1* | 4/2012 | Guyot | H04L 51/12 709/206 |
| 2012/0179557 | A1* | 7/2012 | Gross | G06Q 30/02 705/14.73 |
| 2014/0032672 | A1* | 1/2014 | Yoshikawa | H04W 4/21 709/204 |
| 2014/0244531 | A1* | 8/2014 | Baldwin | G06Q 10/1053 705/319 |
| 2015/0149282 | A1 | 5/2015 | Wolfe et al. | |
| 2015/0199369 | A1* | 7/2015 | Daly | G06F 16/9535 707/748 |

OTHER PUBLICATIONS

Moretti, "How to Silence People on Facebook you Don't Want to Hear from Anymore," Business Insider, Jun. 16, 2012, 10 pages.

\* cited by examiner

*Primary Examiner* — Samantha (Yuehan) Wang
(74) *Attorney, Agent, or Firm* — Fish & Richardson P.C.

(57) ABSTRACT

A system and method for user content presentation, including: receiving, in association with a request to establish a graph relationship between a first account and a second account, a strength of relationship from the first account to the second account, the strength of relationship selected based on input from a user of the first account; selecting, by a computer processor, a delivery attribute associated with the second account based on the strength of relationship, where the delivery attribute is positively correlated with a measure of content authored by the second account to be provided to the first account; selecting content authored by the second account for inclusion in a stream of the first account based on the delivery attribute; and providing the stream of the first account for display on a client computing device.

21 Claims, 11 Drawing Sheets

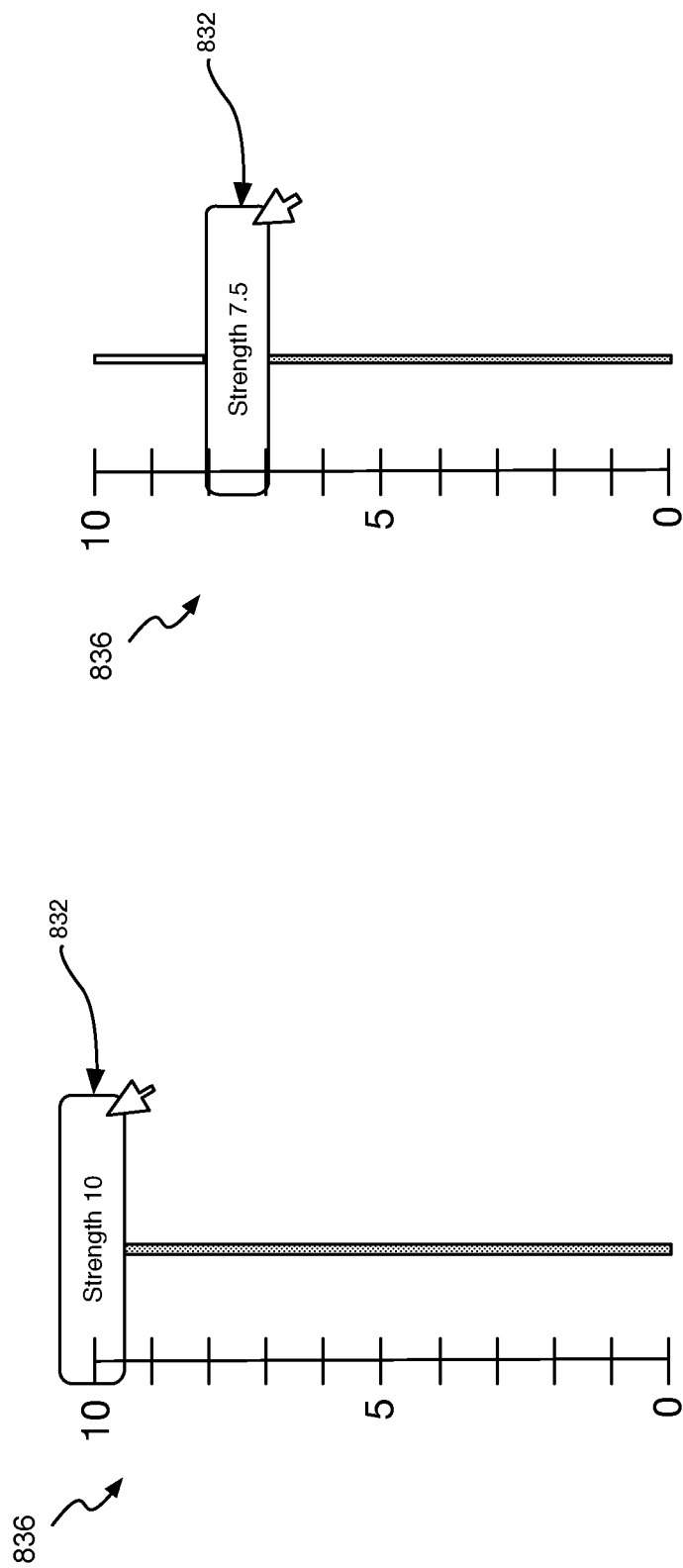

USER CONTENT PRESENTATION BASED ON STRENGTH OF RELATIONSHIP

CROSS REFERENCE TO RELATED APPLICATIONS

This application is a continuation of and claims priority to U.S. patent application Ser. No. 14/507,826, filed on Oct. 6, 2014, and now U.S. Pat. No. 10,049,472, the entire contents of which are hereby incorporated by reference.

BACKGROUND

A messaging platform (e.g., a social network) can provide content presentation for large numbers of individuals and organizations. A messaging platform can provide a mechanism for creating accounts and can enable users to designate other accounts from which to obtain content via the messaging platform. For example, a messaging platform can provide a mechanism that enables a user to designate one or more other accounts in the messaging platform to "Follow" so that content authored by those designated accounts will appear in a stream of the user. In addition, a messaging platform can provide an "Unfollow" mechanism that enables a user to rescind those designations.

SUMMARY

In general, in one aspect, the invention relates to a method for user content presentation. The method can include: receiving, in association with a request to establish a graph relationship between a first account and a second account, a strength of relationship from the first account to the second account, the strength of relationship selected based on input from a user of the first account; selecting, by a computer processor, a delivery attribute associated with the second account based on the strength of relationship, where the delivery attribute is positively correlated with a measure of content authored by the second account to be provided to the first account; selecting content authored by the second account for inclusion in a stream of the first account based on the delivery attribute; and providing the stream of the first account for display on a client computing device.

In general, in one aspect, the invention relates to a method for user content presentation. The method can include: displaying a strength of relationship (SOR) control element on a client computing device, where the SOR control element enables a user of a first account of a messaging platform to specify an SOR from the first account to a second account of the messaging platform; identifying an SOR based on a selection of the SOR control element by the user; providing the SOR to the messaging platform; and receiving a stream based on a measure of content authored by the second account from the messaging platform, where the SOR is positively correlated with the measure of content.

In general, in one aspect, the invention relates to a system for user content presentation. The system can include a computer processor; a strength of relationship (SOR) module executing on the computer processor and configured to: receive, in association with a request to establish a graph relationship between a first account and a second account, a strength of relationship from the first account to the second account, the strength of relationship selected based on input from a user of the first account; select a delivery attribute associated with the second account based on the strength of relationship, where the delivery attribute is positively correlated with a measure of content authored by the second account to be provided to the first account; select content authored by the second account for inclusion in a stream of the first account based on the delivery attribute; and provide the stream of the first account for display on a client computing device.

In general, in one aspect, the invention relates to a non-transitory computer-readable storage medium having instructions for user content presentation. The instructions are configured to execute on at least one computer processor to enable the computer processor to: receive, in association with a request to establish a graph relationship between a first account and a second account, a strength of relationship from the first account to the second account, the strength of relationship selected based on input from a user of the first account; select, by a computer processor, a delivery attribute associated with the second account based on the strength of relationship, where the delivery attribute is positively correlated with a measure of content authored by the second account to be provided to the first account; select content authored by the second account for inclusion in a stream of the first account based on the delivery attribute; and provide the stream of the first account for display on a client computing device.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

FIGS. 8A-8D and 9A-9C show SOR control elements that enable selection of values in a range for a strength of relationship in accordance with one or more embodiments.

DETAILED DESCRIPTION

Figure 1A:
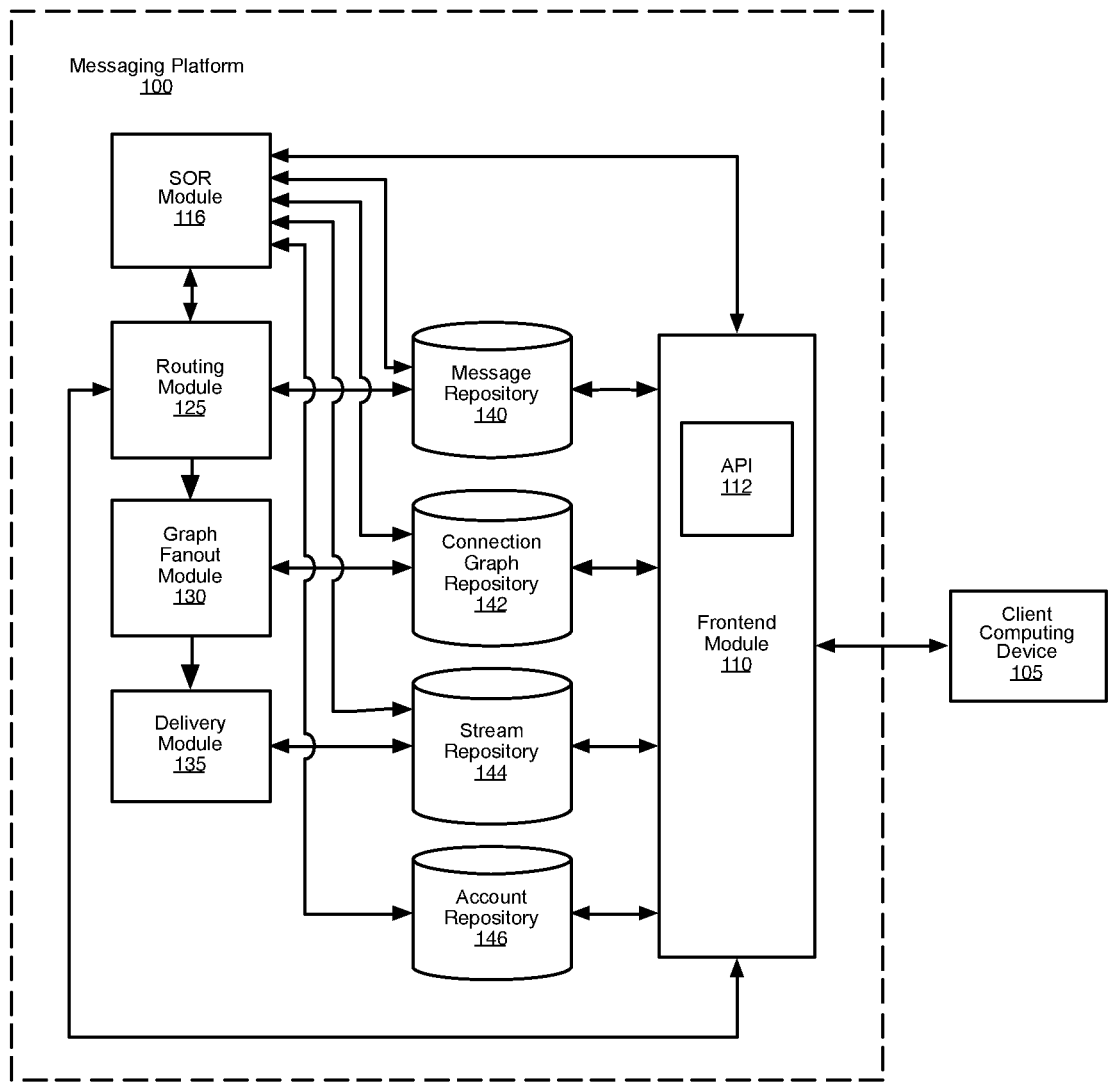
FIG. 1A shows a schematic diagram of a system, in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the invention provide a method and system for user content presentation by identifying a strength of relationship from a recipient account of a messaging platform to a connected account of the messaging platform and providing a stream to the recipient account based on the strength of relationship.

FIG. 1A shows a messaging platform 100 and a client computing device 105 in accordance with one or more embodiments of the invention. As shown in FIG. 1A, the messaging platform 100 has multiple components including a frontend module 110 with an application programming interface (API) 112, a strength of relationship (SOR) module 116, a routing module 125, a graph fanout module 130, a delivery module 135, a message repository 140, a connection graph repository 142, a stream repository 144, and an account repository 146. One or more components of the messaging platform 100 can be communicatively coupled with one or more other components of the messaging platform 100 (e.g., the SOR module 116 may be communicatively coupled with the frontend module 110 and the routing module 125). Various components of the messaging platform 100 can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments, the messaging platform 100 is a platform for facilitating real-time communication between one or more entities. For example, the messaging platform 100 may store millions of accounts of individuals, businesses, and/or other entities (e.g., pseudonym accounts, novelty accounts, etc.). One or more users of each account may use the messaging platform 100 to send messages to other accounts inside and/or outside of the messaging platform 100. The messaging platform 100 may be configured to enable users to communicate in "real-time", i.e., to converse with other users with a minimal delay and to conduct a conversation with one or more other users during concurrent sessions. In other words, the messaging platform 100 may allow a user to broadcast messages and may display the messages to one or more other users within a reasonable time frame so as to facilitate a live conversation between the users. Recipients of a message may have a predefined graph relationship with an account of the user broadcasting the message (e.g., based on an asymmetric graph representing accounts as nodes and edges between accounts as relationships). In one or more embodiments, the user is not an account holder or is not logged in to an account of the messaging platform 100. In this case, the messaging platform 100 may be configured to allow the user to broadcast messages and/or to utilize other functionality of the messaging platform 100 by associating the user with a temporary account or identifier.

In one or more embodiments, the SOR module 116 includes functionality to generate one or more content groups, each including content associated with a subset of unviewed messages of an account of the messaging platform 100. Relationships between accounts of the messaging platform 100 can be represented by a connection graph.

Figure 1B:
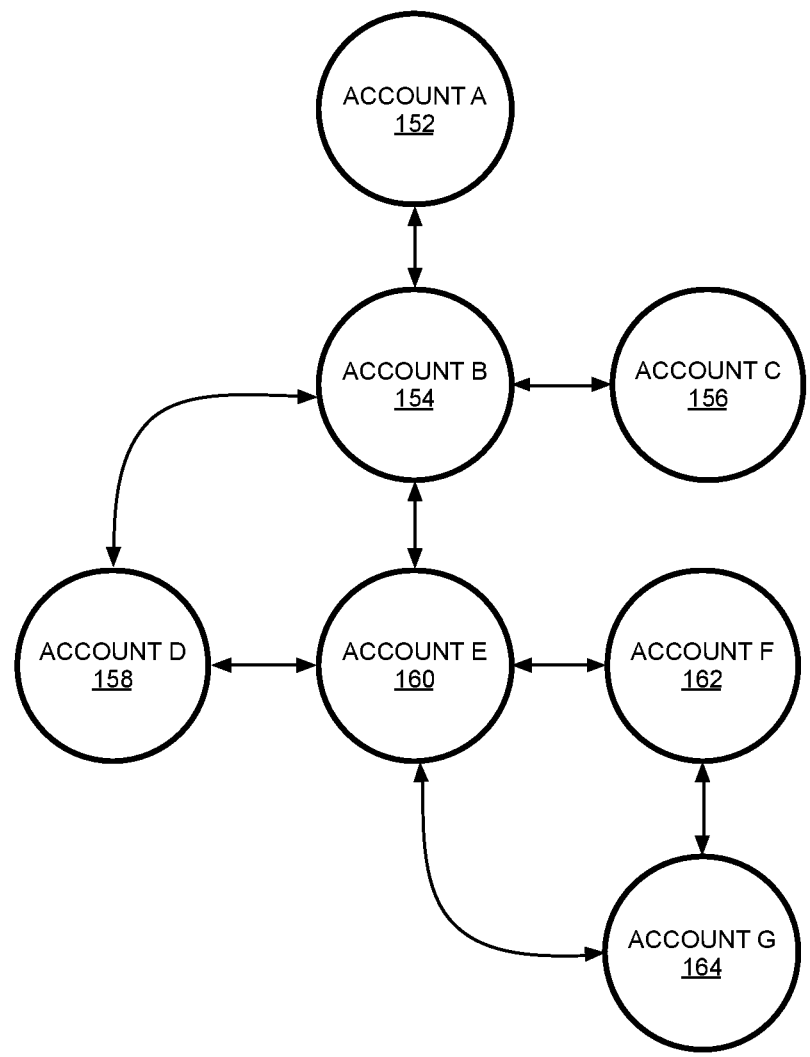
FIG. 1B shows an example depiction of a connection graph in accordance with one or more embodiments.

FIG. 1B shows an example depiction of a connection graph 150 in accordance with one or more embodiments of the invention. In one or more embodiments, the connection graph repository 142 is configured to store one or more connection graphs. As shown in FIG. 1B, the connection graph 150 includes multiple components including nodes representing accounts of the messaging platform 100 (i.e., Account A 152, Account B 154, Account C 156, Account D 158, Account E 160, Account F 162, Account G 164) and edges connecting the various nodes.

The connection graph 150 is a data structure representing relationships (i.e., connections) between one or more accounts. The connection graph 150 represents accounts as nodes and relationships as edges connecting one or more nodes. A relationship may refer to any association between the accounts (e.g., following, friending, subscribing, tracking, liking, tagging, and/or etc.). The edges of the connection graph 150 may be directed and/or undirected based on the type of relationship (e.g., bidirectional, unidirectional), in accordance with various embodiments of the invention.

Many messaging platforms include functionality to broadcast streams of messages to one or more accounts based at least partially on a connection graph representing relationships between those accounts (see FIG. 1B). A stream may be a grouping of messages associated with one or more accounts or can reflect any arbitrary organization of messages that is advantageous for the user of an account. In accordance with various embodiments of the invention, a "message" is a container for content broadcasted/posted by or engaged by an account of a messaging platform. Messages can be authored by users and can include any number of content types (multimedia, text, etc.).

Returning to FIG. 1A, in one or more embodiments, the SOR module 116 includes functionality to receive, in association with a request to establish a graph relationship between a recipient account and a connected account, a strength of relationship from the recipient account to the connected account. The recipient account may be any account of the messaging platform 100 and the connected account may be any account of the messaging platform 100 to which the recipient account has formed a graph connection (e.g., follower, friendship, interest, etc.). The recipient account may receive a stream including messages broadcasted by one or more accounts including the connected account. For example, the recipient account may form a relationship with the connected account using a request to connect with the connected account (e.g., "follow" the connected account to receive messages broadcasted by the connected account), and as a result, a connection graph relationship may be established between the recipient account and connected account. Messages broadcasted by the connected account may then be included in a stream of the recipient account.

The strength of relationship from the recipient account to the connected account is not limited to any particular form. A strength of relationship can be a numerical value, e.g., a value in the range 0 through 10 with 0 representing a weakest relationship and 10 a strongest relationship. The numerical values may be continuous in a range or limited to discrete values in a range, e.g., integer values within the range 0 through 10 and/or percentage values within a range of 0 through 100 percent. An indication of a strength of relationship can be a text indicator. A text indicator can specify strength levels, e.g., "Lowest", "Low", "Medium", "High", "Highest". A text indicator can be descriptive, e.g., "Casual", "Highly Interested", "Friend", "Fan", "Acquainted". A text indicator can describe a relationship category, e.g., "Friend", "Family", "News", "Professional". Each indication can correspond with a predefined numeric (or other) strength of relationship value.

A strength of relationship can reflect the subjective or objective interests or preferences of the user of the recipient account. For example, a user of the recipient account may have a mild interest in the connected account and initially select a moderately strong relationship. Then after consuming content from the connected account, the recipient account may upgrade the relationship to a stronger relationship or downgrade it to a weaker one. A user possessing a particularly strong interest in the connected account (e.g., a celebrity or unique news or information source) can choose a relationship of the highest strength (e.g., "Highly Interested" or 10 on a scale of 10).

A relative strength or weakness of a relationship can be interpreted depending on a particular user content presentation. For example, it may be determined that weak relationships are more correlated with interest, while strong relationships are more correlated with social connections. Thus, an interest-based timeline (e.g., a discover timeline) can weight weak relationships more heavily, while a social-based timeline can weight strong relationships more heavily.

In addition, a strength of relationship can be used to establish a negative correlation. For example, if a user is blocking a particular account, then the messaging platform 100 can also block messages from accounts with strong relationships to the particular account and messages from accounts to which the particular account has a strong relationship.

An indication of a strength of relationship selected by a user can be used to refine, validate, correct, or adjust a pre-existing strength of relationship (or estimate thereof). For example, the SOR module 116 includes functionality to estimate the strength of relationship from the recipient account to the connected account based on engagements involving the recipient and connected account accounts, and then the SOR module 116 may use the selected received strength of relationship to refine that estimate. The SOR module 116 can include functionality to determine an estimate of the strength of relationship based on one or both of the accounts' behavior history, engagement history, preferences, connection graph status, and/or any other information. For example, if the user of the recipient account rarely comments on or rarely rebroadcasts messages authored by the connected account, then a relatively low strength of relationship from the recipient account to the connected account can be inferred. A received strength of relationship can indicate a stronger relationship than the estimate or a weaker relationship than the estimate, or validate the estimate, and the estimate can be adjusted or validated accordingly.

In one or more embodiments, the strength of relationship is selected based on input from a user of the recipient account. For example, the SOR module 116 can generate a user interface that enables a user of the recipient account to input or select or otherwise specify the strength of relationship.

In one or more embodiments, the SOR module 116 includes functionality to select a delivery attribute associated with the connected account based on the strength of relationship. A delivery attribute enables the messaging platform 100 to adapt a flow of information associated with the connected account to the recipient account in accordance with the strength of relationship. For example, if the user of the recipient account selects a high strength of relationship to the connected account, then the SOR module 116 can select a delivery attribute that allows a large flow of information associated with the connected account. But if the user of the recipient account has selected a low strength of relationship to the connected account, then the SOR module 116 can select a delivery attribute that allows only a limited flow of information associated with the connected account.

In one or more embodiments, the delivery attribute is positively correlated with a measure of content authored by the connected account to be provided to the recipient account. A delivery attribute positively correlated with a measure of content enables the messaging platform 100 to increase or decrease an amount or type of messages included in a stream of the recipient account. The measure of content may be any measure (e.g. rate of messages, percentage of messages from the connected account that appear in the timeline or stream of the recipient account, including or excluding messages based on message type, including or excluding a message based on previous engagements by users with the message, etc.). For example, a delivery attribute may specify a maximum of 1 or 10 messages per hour.

In one or more embodiments, the measure of content is a rate at which content from the connected account is included in the stream of the recipient account. For example, a rate limit on push messages authored by the connected account can be calculated from a strength of relationship from the recipient account to the connected account as a numerical value (SOR value) in a range. An example of a rate limit is X messages per hour where X=5*SOR value for an SOR value ranging from 0 through 1. The messaging platform 100 can enforce the limit of X/hour when constructing a stream for the recipient account by excluding real-time push notifications authored by the connected account from the stream of the recipient account and saving excluded push notification for sending to the recipient account at a later time in accordance with the rate limit.

In one or more embodiments, selecting the delivery attribute includes selecting a content type from the connected account to be included in the stream of the recipient account. A content type enables the inclusion of messages in the stream of the recipient account to be adapted in accordance with a strength of relationship by including or excluding messages from the stream. Examples of content types include direct messages, broadcasted messages, push messages, shared messages, and email notifications. For example, the messaging platform 100 can include all content types associated with the connected account in the stream of the recipient account if the strength of relationship from the recipient account to the connected account indicates a strong relationship, (e.g., "Highly Interested"). On the other hand, the messaging platform 100 may include only direct messages authored by the connected account in the stream of the recipient account if the strength of relationship from the recipient account to the connected account indicates a very weak relationship (e.g., 1 on a scale of 10).

In one or more embodiments, selecting a delivery attribute includes selecting the delivery attribute based on a threshold associated with the strength of relationship. For example, a strength of relationship from the recipient account to the connected account exceeding a 50 percent threshold (e.g., exceeding 5 on a scale 0-10), can yield a delivery attribute that causes inclusion of every message authored by the connected account in the stream of the recipient account. In another example, a strength of relationship from the recipient account to the connected account that does not exceed a 40 percent threshold can yield a delivery attribute that causes inclusion of only the messages authored by the connected account that have at least 10 message shares in the stream of the recipient account.

In one or more embodiments, the SOR module 116 includes functionality to select content authored by the connected account for inclusion in a stream of the recipient account based on the delivery attribute. For example, the SOR module 116 can select content authored by the connected account for inclusion in a stream of the recipient account based on the content type, rate of messages, or a combination of content type and rate, or any other measure called for by the delivery attribute.

In one or more embodiments, the SOR module 116 includes functionality to provide the stream of an account for display on a client computing device. For example, the SOR module 116 can employ functionality in the frontend module 110 via the API 112 to provide the stream to the client computing device of the recipient account (e.g., the client computing device 105). The frontend module 110 can provide functionality to send a stream for display on the client computing device 105 using Internet communication protocols. An application adapted to the messaging platform 100 may be run on the client computing device 105 to display a stream of a user of the client computing device 105.

In one or more embodiments, the SOR module 116 includes functionality to identify a threshold popularity score defined by the delivery attribute. A threshold popularity score enables the flow of information to be adapted in accordance with a strength of relationship by including or excluding messages from a stream based on a measure of the popularity of the content. For example, a threshold popularity score enables the flow of information from the connected account to the recipient account to be adapted in accordance with a strength of relationship from the recipient account to the connected account by including or excluding messages from a stream of the recipient account based on a measure of the popularity of the content.

In one or more embodiments, the SOR module 116 includes functionality to determine that a content popularity score associated with content authored by an account exceeds the threshold popularity score. When a content popularity score associated with content authored by an account exceeds the threshold popularity score, it can be included in a stream. For example, when a content popularity score associated with content authored by the connected account exceeds the threshold popularity score, it can be included in the stream of the recipient account.

In one or more embodiments, the content popularity score is based on engagement by other users with the content. Examples of engagements by other users with the content include a number of rebroadcasts of the content, a number of favorites/likes of the content, a number of responses to the content, a number of mentions or references of the content, a number of followers/connections/friends of the account that authors the content, and/or prior engagement within a conversation between two accounts.

In one or more embodiments, selecting the content for inclusion in the stream of the recipient account is further based on the content popularity score exceeding the threshold popularity score. A comparison can be a comparison of raw scores (e.g., an X amount of rebroadcasts for the content compared to a threshold of T amount of rebroadcasts), or the scores can be normalized based on levels of activity in the messaging platform 100.

In one or more embodiments, selecting content authored by the connected account for inclusion in the stream of the recipient account is further based on a content attribute associated with the content authored by the connected account and a content attribute associated with content authored by a reference account and a strength of relationship between the recipient account and the reference account. The reference account may be any other account of the messaging platform 100. For example, a message authored by the connected account, that might otherwise be excluded from a stream of the recipient account based on the strength of relationship from the recipient account to the connected account, can be included if it has a content attribute that matches a content attribute of content authored by the reference account and the recipient account has a strong relationship to the reference account. The content attributes that describe the content authored by the connected account and the reference account can be based on keywords or other indicators of the subject matter, topic of the content, geographic information pertaining to the content, or other descriptive information of the content (e.g., one or more hashtags each of which can be a word or phrase preceded by a hash or pound sign (#) that identifies messages on a specific topic.

In one or more embodiments, the SOR module 116 includes functionality to select a message from an authoring account for inclusion in the stream of the recipient account based on a strength of relationship from the connected account to the authoring account and the strength of relationship from the recipient account to the connected account. The authoring account may be any other account of the messaging platform 100. Comparing strengths of relationships can be used in a variety of ways. For example, a message generated by the authoring account can be included in a stream of the recipient account if there is a strong relationship from the recipient account to the connected account and a strong relationship from the connected account to the authoring account, even if there is a weak or no relationship from the recipient account to the authoring account. If the connected account is being blocked by the recipient account, then a message authored by the authoring account can be excluded from the stream of the recipient account if there is a strong relationship from the connected account to the authoring account or vice versa. For example, if a user of the recipient account is blocking the connected account belonging to an overexposed celebrity, then the SOR module 116 can exclude messages authored by highly interested fans of the overexposed celebrity from a stream of the recipient account.

In one or more embodiments, the strength of relationship specifies a type of relationship. The user may select from among a set of predetermined types of relationships provided in a user interface of the client device. The predetermined types of relationships may be arranged into a set of relationship categories, e.g., immediate family, business associate, neighbor, or any other category. Each relationship category can correspond to a strength or weakness of relationship. For example, a strength of relationship that specifies immediate family can be a relatively strong relationship in comparison to a neighbor category or business associate category. The relationship categories can correspond to SOR values or textual descriptions of relationship strength.

In one or more embodiments, the SOR module 116 includes functionality to determine a popularity measure pertaining to the connected account in response to the strength of relationship. A high strength of relationship can increase a popularity measure whereas a low strength of relationship can decrease it. A popularity measure can be any aggregation of strength of relationships from a number of accounts to the connected account. For example, the popularity measure can be determined based on an average strength of relationship, mean strength of relationship, median strength of relationship, typical strength of relationship, number of accounts having a particular strength of relationship, etc.

In one or more embodiments, the SOR module 116 includes functionality to generate a notification message that includes the popularity measure. The notification message can be used to encourage engagement. For example, the notification message can be sent to the user of the connected account in an email to encourage engagement with the messaging platform 100 by the user. A notification message can be used to revive an inactive user. For example, a notification message can inform a user that "N users in your network have just listed you as a high strength connection" or "X users that you do not follow have you listed as a high-strength connection" or "your average strength of relationship from users that follow you is Y" or "your popularity score has increased in the past week from P1 to P2". In one or more embodiments, the SOR module 116 includes functionality to provide the notification message for display on a client computing device of an account. For example, the SOR module 116 can employ the frontend module 110 via the API 112 to send an email notification message that includes a popularity measure to a client computing device of the account.

In one or more embodiments, the SOR module 116 includes functionality to determine a relationship recommendation in response to the strength of relationship. For example, a strength of relationship can be combined with information in the connection graph 150 (FIG. 1B) to determine a relationship recommendation. A high strength of relationship from an account B (FIG. 1B) to an account A (FIG. 1B) can yield a relationship recommendation that an account C (FIG. 1B) should form a relationship with account A based on the relationship between account B and account C. A recommendation can be based on a strength of relationship from account B to account C or a strength of relationship from account C to account B or both (e.g., if one or both strengths of relationship is relatively strong, as well as other information associated with the connection graph 150).

In one or more embodiments, the SOR module 116 includes functionality to generate a notification message that includes the relationship recommendation. For example, a notification message containing a relationship recommendation can be an email message. In one or more embodiments, the SOR module 116 includes functionality to provide the notification message for display on a client computing device of an account. For example, the SOR module 116 can employ the frontend module 110 via the API 112 to send a notification message containing a relationship recommendation to a client computing device. A relationship recommendation can be rendered on a specific area of a display of a client computing device (e.g., next to a message timeline on a client computing device).

In one or more embodiments, the relationship recommendation is determined using a complete graph (also known as a K-complete graph) storing strengths of relationships. The connection graph 150 can be regarded as complete when each of the K accounts represented in the connection graph 150 (FIG. 1B) has a connection (an edge connection) to every other account (i.e., K-1 other accounts) represented in the connection graph 150. For example, a connection graph having 7 accounts is K-7 complete if each of those 7 accounts has a connection to all of the other 6 accounts. The SOR module 116 can detect missing edges in the connection graph 150 that would make it K complete if formed and generate relationship recommendations that are selected to form relationships for those missing connections. For example, if the connection graph 150 is N connections away from being a complete graph, the SOR module 116 can generate relationship recommendations for the incomplete connections in the connection graph 150 as who to follow recommendations. The values of the strength of relationships among the accounts in the connection graph 150 can be used to select the value N such that if the aggregate strength of relationship value of the complete graph exceeds a threshold, a selection of a larger N is allowed to complete the graph.

In one or more embodiments, the SOR module 116 includes functionality to determine a content recommendation in response to the strength of relationship. If a strength of relationship is relatively strong, (e.g., "Fan" or "Highly Interested"), then content recommendations can be made based on activities associated with the connected account. For example, if the connected account has designated a web site, video, or news story as a favorite then that content can be recommended to strong followers of the connected account. Similarly, if the connected account has commented on, broadcasted messages, or re-broadcasted messages pertaining to a web site, video, or news story, then that content can be recommended to strong followers of the connected account. Engagements by multiple accounts with content can be weighted by the strengths of relationships from the recipient account to those accounts when using those engagements to formulate a content recommendation for the recipient account.

In one or more embodiments, the SOR module 116 includes functionality to generate a notification message that includes the content recommendation. A notification message containing a content recommendation can be an email message. In one or more embodiments, the SOR module 116 includes functionality to provide the notification message for display on the client computing device. The SOR module 116 can employ the frontend module 110 via the API 112 to send the notification message containing a content recommendation to a client computing device of an account.

In one or more embodiments, the measure of content is positively correlated with a baseline production rate of content authored by an account. For example, if the connected account has a relatively low baseline production rate (e.g., broadcasts a message once a week), then content authored by the connected account can be included in a stream of the recipient account even if the strength of relationship from the recipient account to the connected account indicates a relatively weak relationship. On the other hand, if the connected account has a relatively high baseline production rate (e.g., broadcasts messages once per hour), then content authored by the connected account can be excluded from a stream of the recipient account if the strength of relationship from the recipient account to the connected account indicates a relatively weak or a relationship of moderate strength.

In one or more embodiments, the SOR module 116 includes functionality to adjust the measure of content in response to a change in the baseline production rate of an account. For example, if the connected account has a relatively low baseline production rate, but for a day or two exhibits a relatively high rate of messaging, then the measure of content authored by the connected account to be included in the stream of the recipient account can be decreased if the strength of relationship from the recipient account to the connected account indicates a relatively weak relationship.

In one or more embodiments, functionality is included to display a strength of relationship (SOR) control element on a client computing device, where the SOR control element enables a user of an account of the messaging platform 100 to specify an SOR. An SOR control element can be presented to a user of a client computing device through cooperative interaction of functionality of the SOR module 116 and user interface functionality in a client computing device via the frontend module 110 via the API 112. For example, if a client computing device is a personal computer, then web protocols may be employed to generate the SOR control element, and if a client computing device is a mobile device, mobile app functions may be employed to generate the SOR control element.

In one or more embodiments, the SOR indicates a strength of relationship. A strength of relationship may be unidirectional, and any two accounts can specify an independent strength of relationship to the other. In one or more embodiments, functionality is included to identify an SOR indicated by a user via the SOR control element and provide the SOR to the messaging platform. A client computing device (e.g., the client computing device 105), can include a pointing and selection device, touch screen, voice interface, or other interface for obtaining a selection for the SOR from a user and communication functionality for sending the selected SOR back to the messaging platform 100.

In one or more embodiments, functionality is included to receive a stream based on a measure of content authored by an account from the messaging platform. The client computing device 105 can include communication functionality to receive the stream selected by the SOR module 116 from the messaging platform 100. In one or more embodiments, the SOR is positively correlated with the measure of content.

In one or more embodiments, the SOR control element is displayed in response to user interaction with a user interface element displayed on the client computing device corresponding to an account. For example, the SOR control element can appear when a user hovers a pointer over a user interface element or taps on a user interface element displayed on a touch screen device (e.g., a follow button), corresponding to the account. The SOR control element can be displayed in response to explicit user selection of a user interface element (e.g., a follow button), corresponding to the account.

In one or more embodiments, displaying an SOR control element includes displaying an indication of a default SOR on the client computing device in response to user selection of a user interface element corresponding to an account on the client computing device. A default SOR indication (e.g., "Casual") can be displayed when a user hovers over or selects a user interface button (e.g., "Follow" button) corresponding to the account. A default value for the SOR (e.g., 5 in the range 0-10) can be displayed when a user hovers over or selects a user interface button corresponding to the account. In one or more embodiments, displaying an SOR control element includes displaying the SOR control element in response to the user selecting the default SOR indication. An SOR control element can appear and enable the user to alter the default SOR indication.

In one or more embodiments, the SOR control element depicts a slider control. A slider control can enable selection of continuous values for the SOR within a range. A slider control can enable selection of discrete values for an SOR from among a set of predetermined values.

Figure 2:
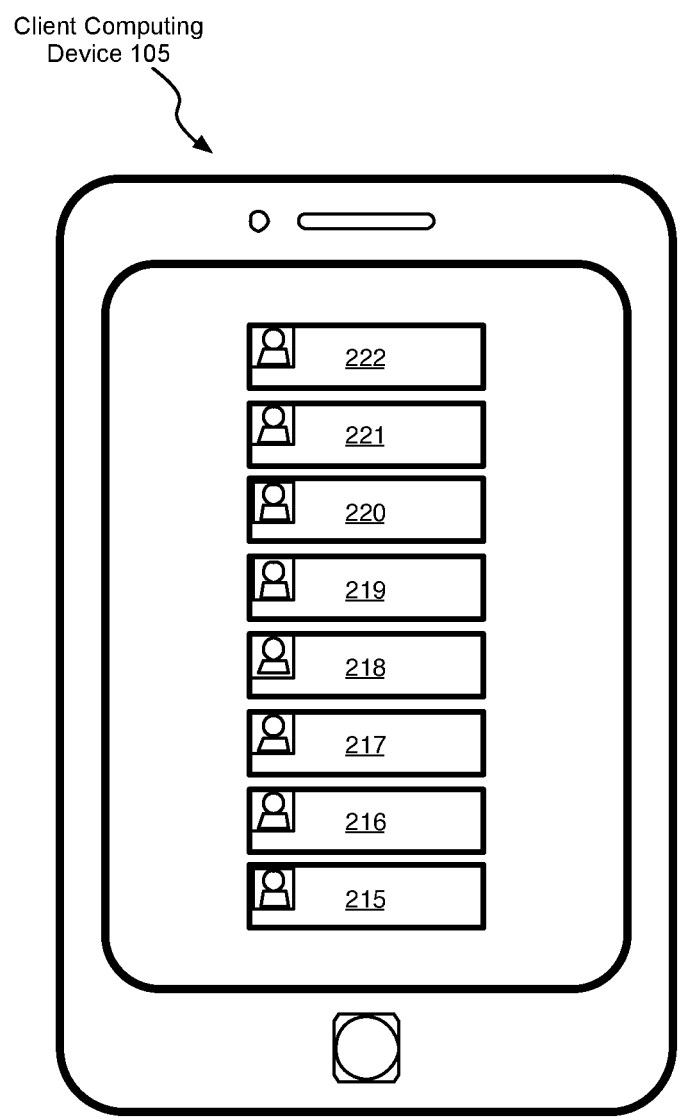
FIG. 2 shows messages corresponding to a stream generated by a messaging platform and presented on a client of the messaging platform in accordance with one or more embodiments.

FIG. 2 shows messages corresponding to a stream generated by the messaging platform 100 and presented on the client computing device 105 of the messaging platform 100. The stream includes a series of messages 215-222 (e.g., broadcasted messages). The messages 215-222 may be arranged as a timeline in which the message 222 is the newest and the message 215 the oldest. The messaging platform 100 selects the messages 215-222 for inclusion in the stream of the account of the client computing device 105 in accordance with the strengths of relationships from the account of the client computing device 105 to the accounts of the messaging platform 100 that author the messages 215-222. For example, the messages 215-222 can be in a stream of the recipient account in accordance with SORs selected by the recipient account and the messages 215-222 can include messages authored by the connected account.

Figure 3:
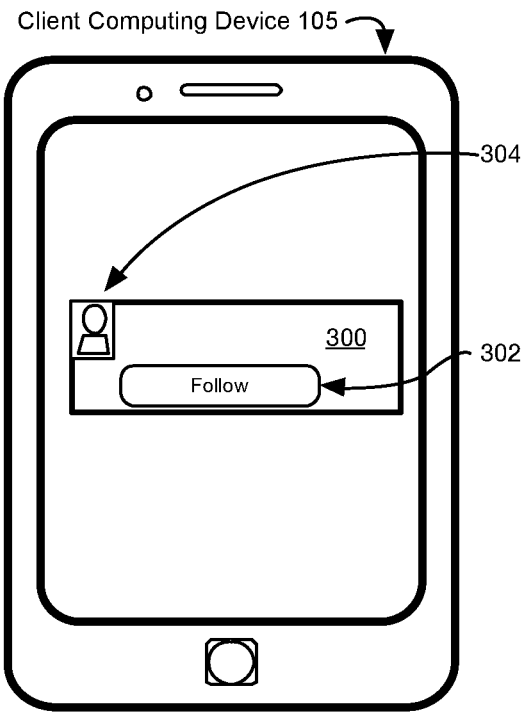
FIG. 3 shows an interface element presented on a client that provides a "who to follow" recommendation from a messaging platform in accordance with one or more embodiments.

FIG. 3 shows an interface element 300 presented on the client computing device 105 that provides a "who to follow" recommendation from the messaging platform 100. The interface element 300 includes a photo or icon or other image 304 that depicts a user of an account on the messaging platform 100 and a button 302 (e.g., a "Follow" button) that enables a user of the client computing device 105 to establish a relationship with the account corresponding to the photo 304 by pressing or clicking on the button 302.

Figure 4:
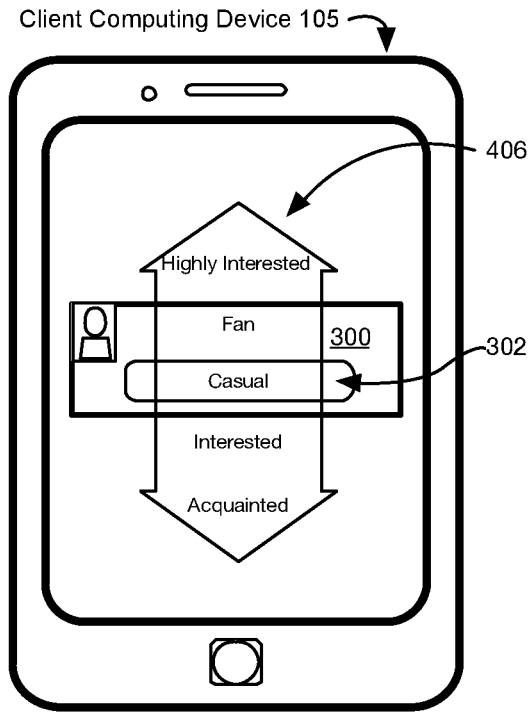
FIG. 4 shows an SOR control element presented on a client that enables a user of the client to specify a strength of relationship in accordance with one or more embodiments.

FIG. 4 shows an SOR control element 406 presented on the client computing device 105 that enables a user of the client computing device 105 to specify a strength of relationship from the account of the client computing device 105 to the account corresponding to the interface element 300. For example, the account of the client computing device 105 can be the recipient account and the account corresponding to the interface element 300 can be the connected account. The SOR control element 406 enables the user of the client computing device 105 to select "Acquainted", "Interested", "Casual", "Fan", or "Highly Interested" for the indication of the strength of relationship. For example, a user of the client computing device 105 can select the button 302 then slide the button 302 up or down to the desired indication and then release the button 302 to the select a positioned indication.

Figure 5:
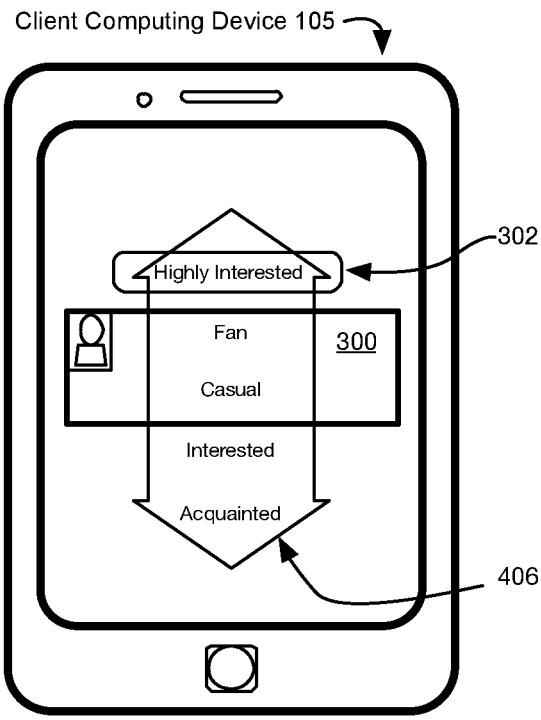
FIGS. 5-6 show interaction with a button for indicating a strength of relationship in accordance with one or more embodiments.
Figure 6:
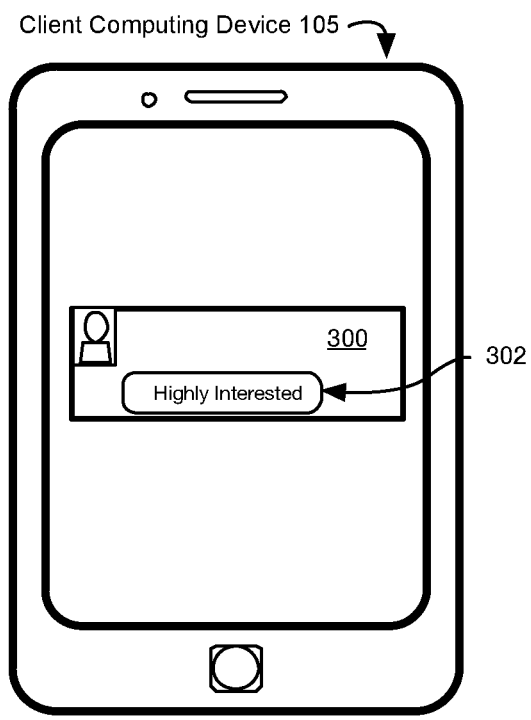
Figure 7A:
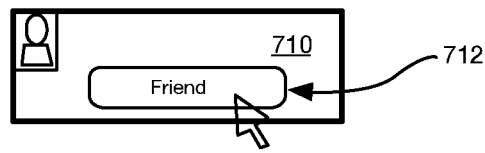
FIGS. 7A-7D depict selection of a strength of relationship by cycling through a predetermined sequence of inputs in accordance with one or more embodiments.
Figure 7B:
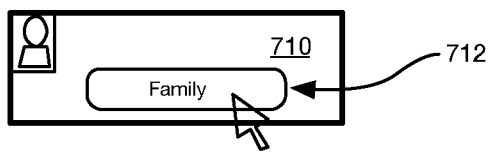
Figure 7C:
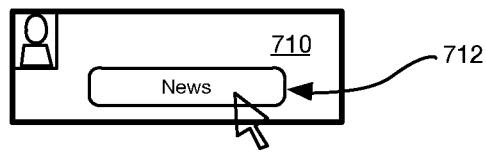
Figure 7D:
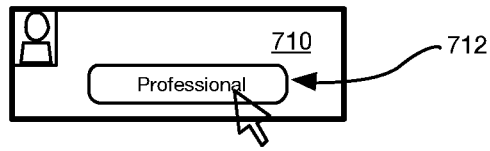
Figure 8D:
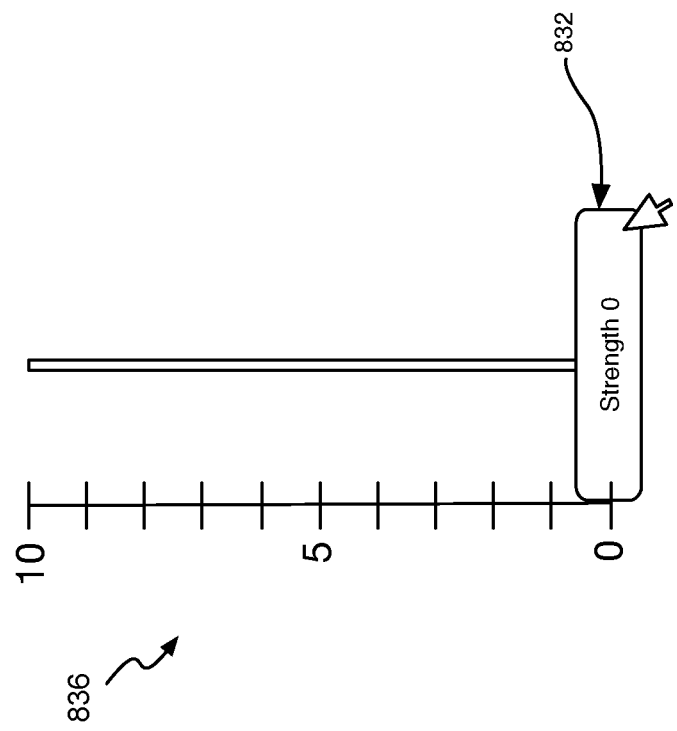
Figure 8C:
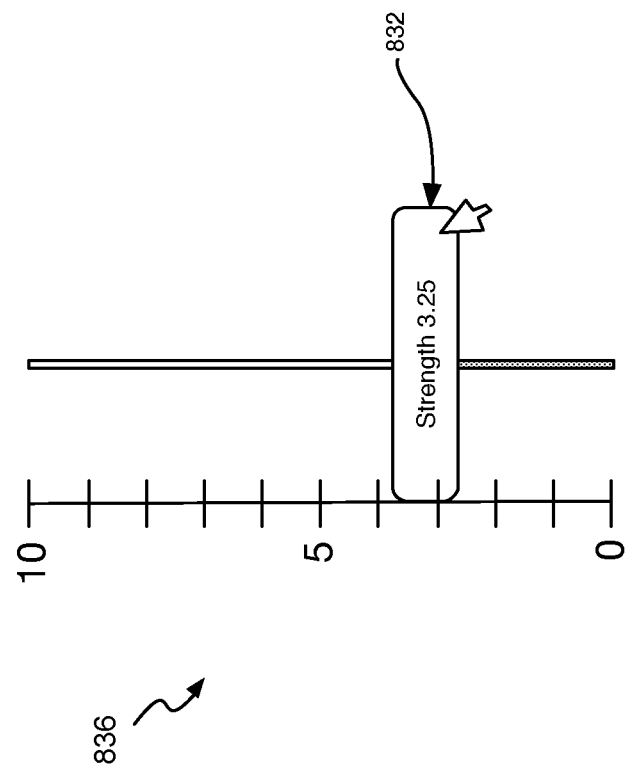

FIG. 5 shows the user of the client computing device 105 having slid the button 302 to a position for selecting "Highly Interested" as the indication of the strength of relationship to the account corresponding to the interface element 300. FIG. 6 shows the user of the client computing device 105 having released the button 302 to select "Highly Interested" as the indication of the strength of relationship in relation to the account corresponding to the interface element 300. The mechanism provided by the SOR control element 406 enables selection of an indication of a strength of relationship when a relationship is first established and a similar mechanism can be used to modify the strength of relationship at a later time.

FIGS. 7A-7D depict specifying a strength of relationship to an account using an interface element 710 by cycling through a predetermined sequence of indications. In this example, the predetermined indications are a set of relationship categories that include "Friend", "Family", "News", and "Professional". A user can step through each possible indication by clicking or selecting a button 712 or a popup control element may be used as described above.

FIGS. 8A-8D show an SOR control element 836 that enables selection of values in a range 0 through 10 for a strength of relationship. A user can click and hold on a button 832 and slide the button 832 anywhere in the range 0 through 10 and then release the button 832 to select that value.

Figure 9A:
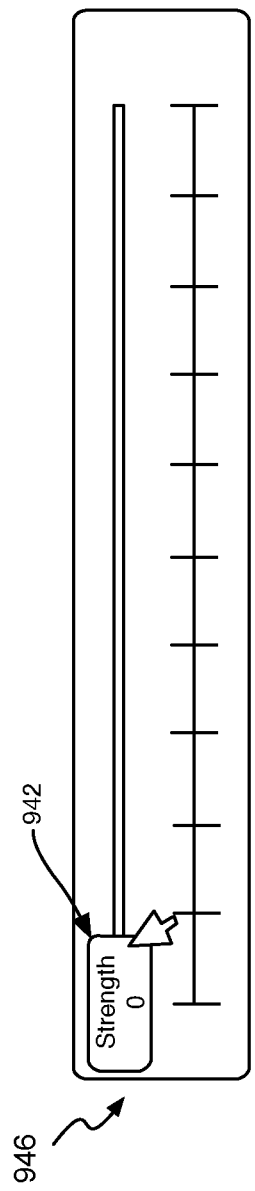
Figure 9B:
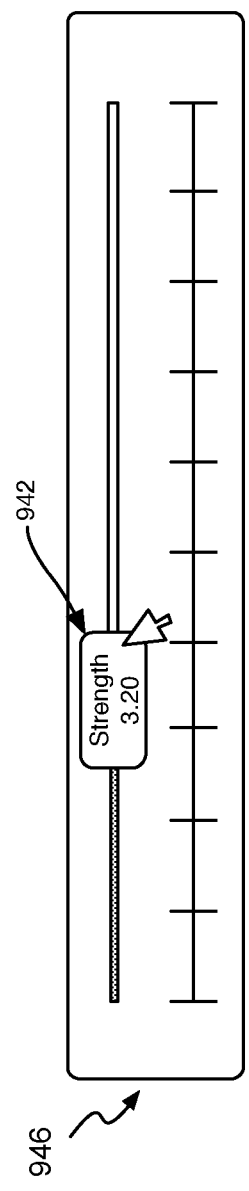
Figure 9C:
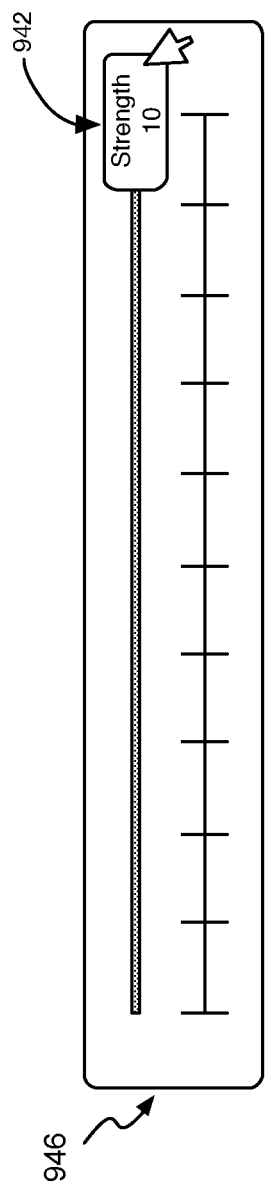

FIGS. 9A-9C show an SOR control element 946 that enables selection of values in a range 0 through 10 for a strength of relationship with increased resolution. A user can click and hold on a button 942 and slide the button 942 anywhere in the range 0 through 10 and then release the button 942 to select that value.

Figure 10:
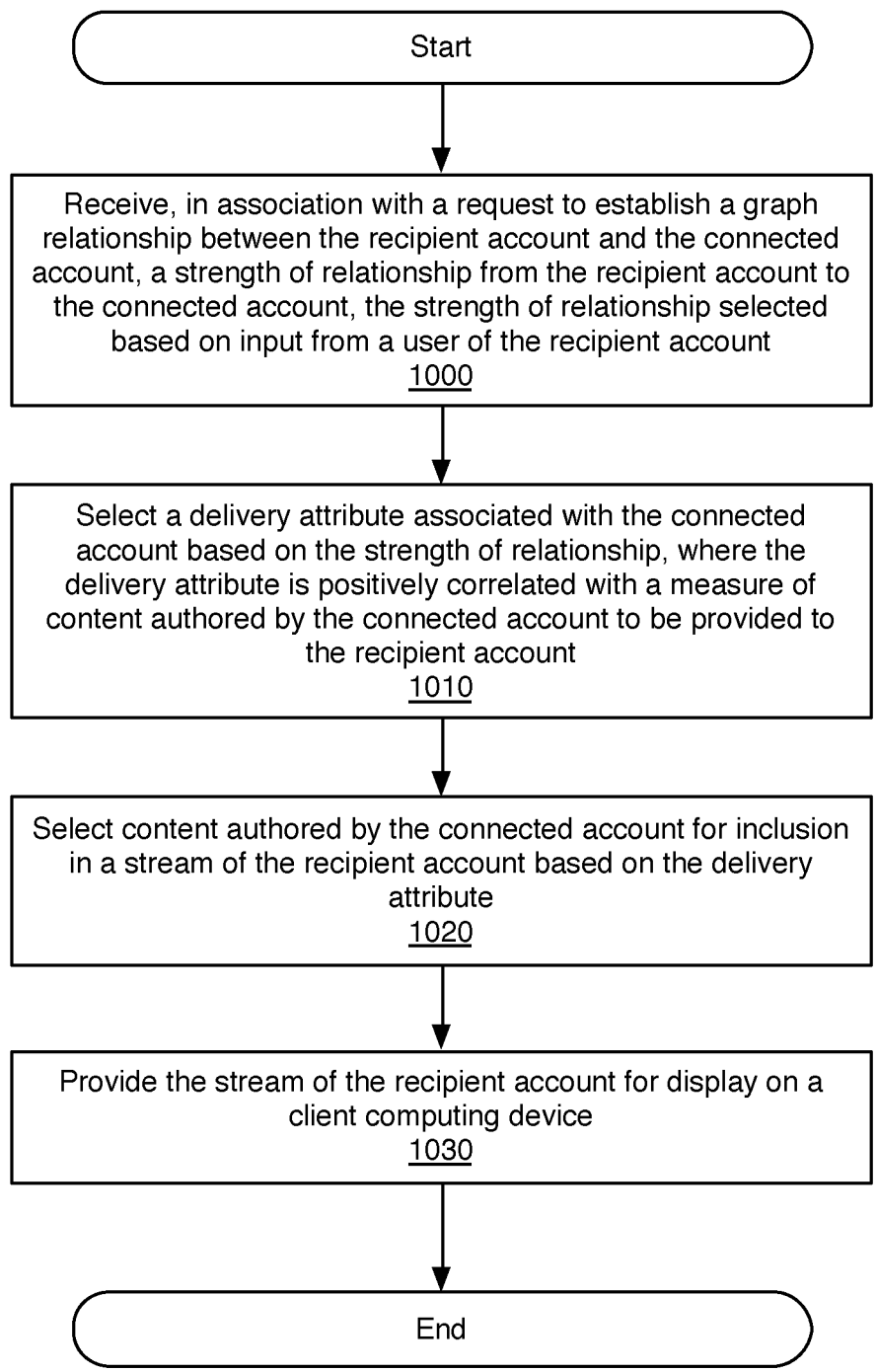
FIGS. 10-11 show flowcharts of methods for user content presentation in accordance with one or more embodiments.

FIG. 10 shows a flowchart of a method for user content presentation (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 10 should not be construed as limiting the scope of the invention.

In STEP 1000, a strength of relationship from the recipient account to the connected account is received in association with a request to establish a graph relationship between the recipient and connected accounts, where the strength of relationship is selected based on input from a user of the recipient account. Specifying the strength of relationship enables a user to follow all the accounts they desire without having their more important accounts drowned out by messaging from less important accounts. For example, a user can indicate a relatively weak relationship to the connected account if the user prefers content from the connected account but is willing to forego some content from the connected account to avoid drowning out content from stronger relationships. On the other hand, a user can indicate a relatively strong relationship if the user is less willing to forego content from the connected account. An indication of a strength of relationship can be selected for any account the user follows and provide the user with fine grained ability to tune their stream to their needs and interests and subjective judgments. For example, a user can select an indication of a relatively weak relationship to an interesting news source and select an indication of a strong relationship to an immediate family member so that the immediate family member will not be drowned out in a stream of the user.

In STEP 1010, a delivery attribute is selected based on a strength of relationship from step 1000. The delivery attribute is positively correlated with a measure of content authored by the connected to be provided to the recipient account. The delivery attribute provides a parameter or a set of parameters for adapting a stream to be delivered to the user of the recipient account to the strength with which the user of the recipient account regards their relationship with the connected account.

In STEP 1020, content authored by the connected account is selected for inclusion in a stream of the recipient account based on the delivery attribute. The selection of content based on a delivery attribute adapts the stream of the recipient account to the strength by which the user of the recipient account subjectively regards the connected account.

In STEP 1030, the stream of the recipient is provided for display on a client computing device. The stream can be a timeline of messages (e.g., broadcasted messages), discovery timeline, direct messages, etc., on a client computing device of a user of the recipient account.

Figure 11:
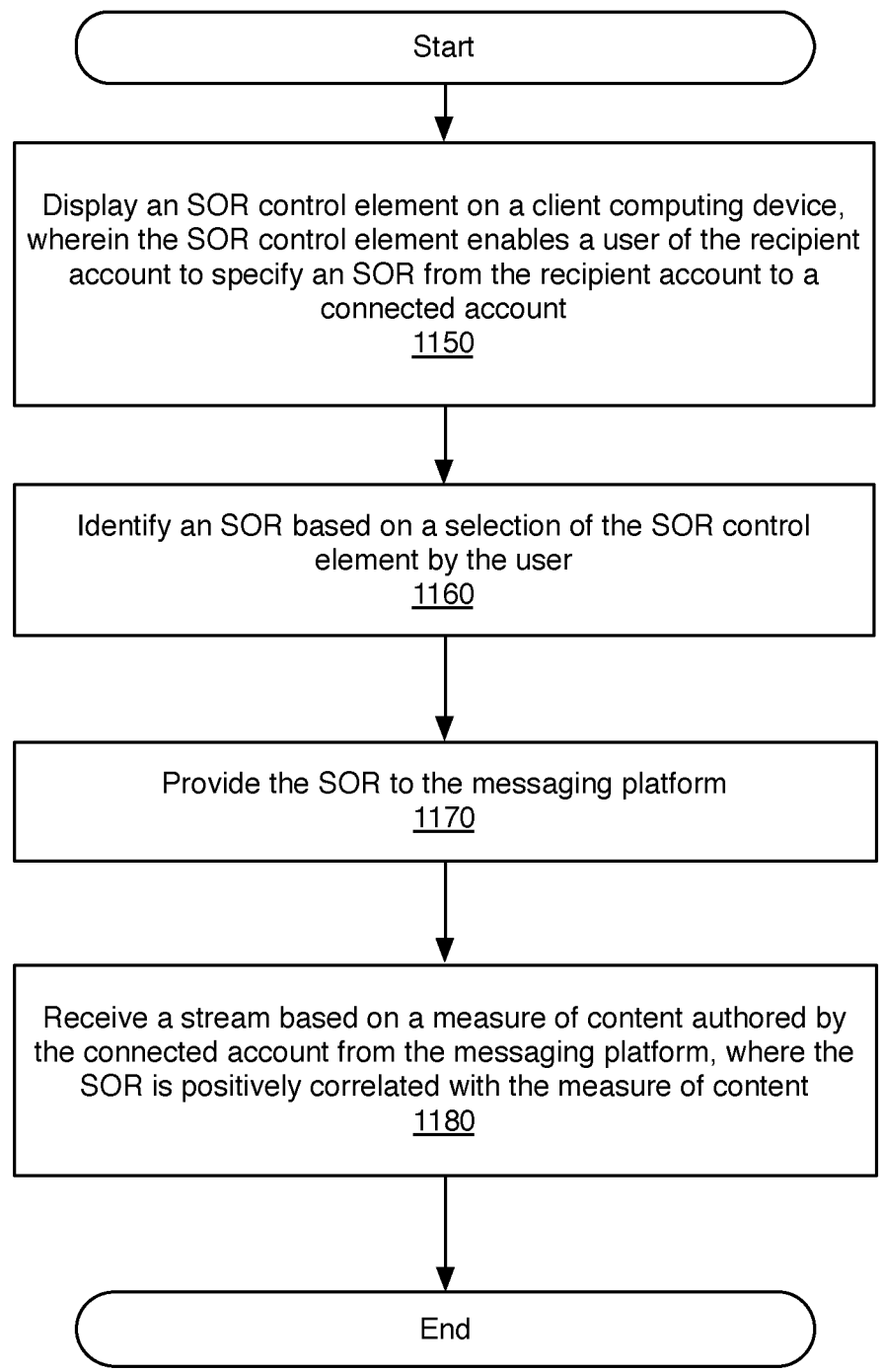

FIG. 11 shows a flowchart of a method for user content presentation (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 11 should not be construed as limiting the scope of the invention.

In STEP 1150, an SOR control element is displayed on a client computing device. The SOR control element enables a user of the recipient account of the messaging platform 100 to specify a strength of relationship to the connected account of the messaging platform 100. The SOR control element can enable selection of continuous values for the strength of relationship within a range or enable selection from among a set of predetermined indications.

In STEP 1160, an SOR based on a selection of the SOR control element by the user is identified. In STEP 1170, the SOR is provided to the messaging platform 100. The specified SOR enables the messaging platform 100 to adapt a stream of the user in accordance with their selection.

In STEP 1180, a stream based on a measure of content authored by the connected account is received from the messaging platform 100. The SOR is positively correlated with the measure of content. The stream, adapted to the user according to their SOR, can be displayed to the user on their client computing device.

Embodiments of the invention may be implemented on a specialized computer system. The specialized a computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments of the invention.

Figure 12:
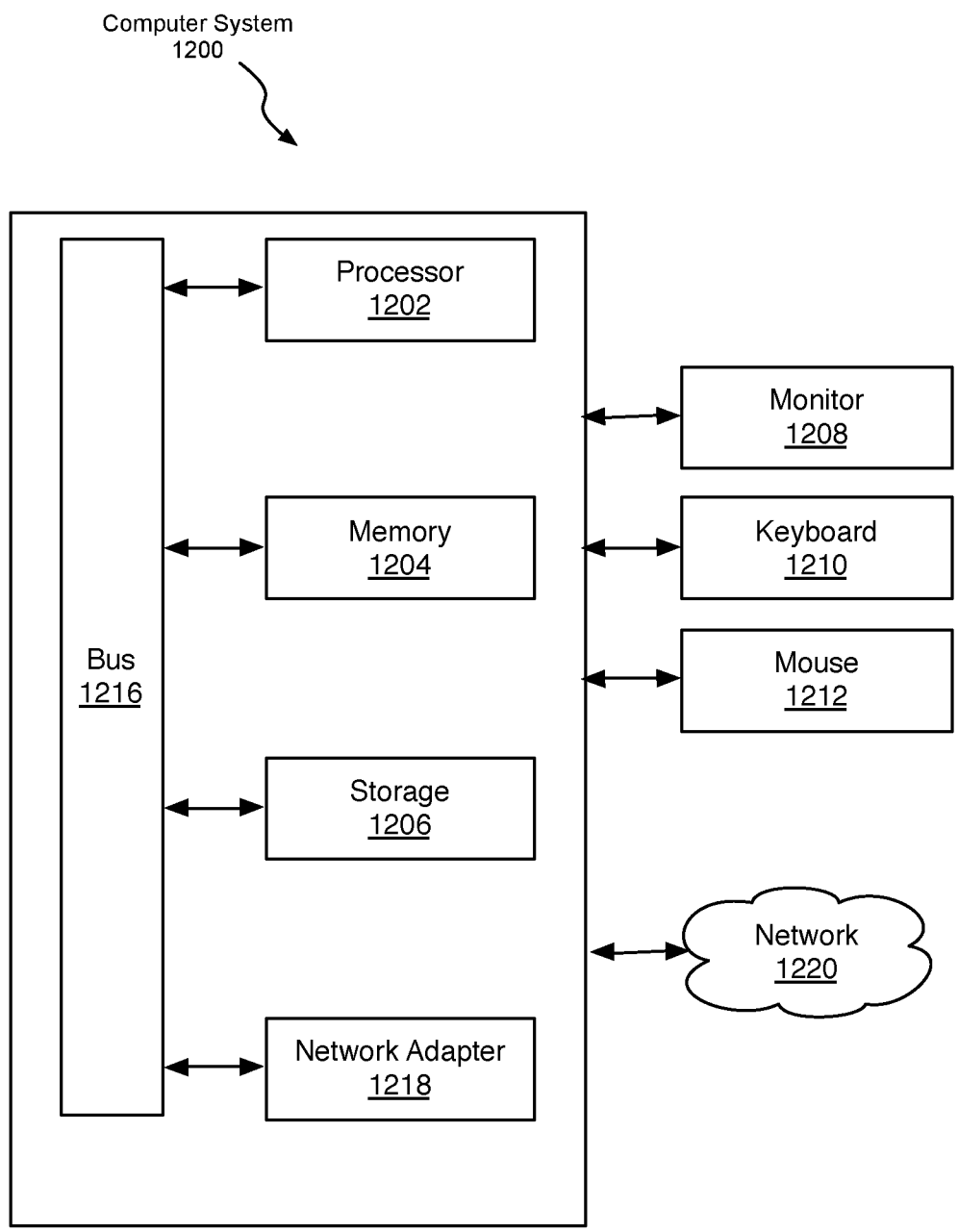
FIG. 12 shows a computer system in accordance with one or more embodiments.

For example, as shown in FIG. 12, a computing system 1200 may include one or more computer processor(s) 1202, associated memory 1204 (e.g., random access memory (RAM), cache memory, flash memory, etc.), one or more storage device(s) 1206 (e.g., a hard disk, an optical drive such as a compact disk (CD) drive or digital versatile disk (DVD) drive, a flash memory stick, etc.), a bus 1216, and numerous other elements and functionalities. The computer processor(s) 1202 may be an integrated circuit for processing instructions. For example, the computer processor(s) may be one or more cores or micro-cores of a processor. The computing system 1200 may also include one or more input device(s), such as a touchscreen or keyboard 1210, a mouse 1212, microphone, touchpad, electronic pen, or any other type of input device. Further, the computing system 1200 may include one or more output device(s) 1208, such as a screen (e.g., a liquid crystal display (LCD), a plasma display, touchscreen, cathode ray tube (CRT) monitor, projector, or other display device), a printer, external storage, or any other output device. The computing system 1200 may be connected to a network 1220 (e.g., a local area network (LAN), a wide area network (WAN) such as the Internet, mobile network, or any other type of network) via a network interface connection, network adapter 1218. The input and output device(s) may be locally or remotely connected (e.g., via the network 1220) to the computer processor(s) 1202, memory 1204, and storage device(s) 1206.

One or more elements of the aforementioned computing system 1200 may be located at a remote location and connected to the other elements over a network 1220. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While the invention has been described with respect to a limited number of embodiments, those skilled in the art, having benefit of this disclosure, will appreciate that other embodiments may be devised which do not depart from the scope of the invention as disclosed herein.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

What is claimed is:

1. A method comprising:
    receiving an input from a user associated with a first account of a messaging platform, wherein, in response to the received input, the messaging platform sets a value indicating a strength of relationship from the first account to a second account;
    determining, based on the value, a delivery attribute that includes one or more parameters for limiting content from the second account that is transmitted to the first account;
    selecting, according to the delivery attribute, which content authored by the second account is to be included in the message stream transmitted to the first account, wherein content authored by the second account that is included in the message stream is limited;
    including in the message stream transmitted to the first account no more content from the second account than the selected content; and
    transmitting, in response to a request received from a client computing device operating on behalf of the first account, one or more messages of the message stream, wherein the client computing device is configured to present the message stream to a user.

2. The method of claim 1, wherein the input is received as part of a request to create a connection between the first account and the second account, wherein creating the connection includes forming a graph relationship between the first account and the second account.

3. The method of claim 1, wherein the input is a selection, on an interface provided by the messaging platform, by the user of either the relationship from a plurality of relationships or the strength of relationship from a plurality of strengths.

4. The method of claim 1, further comprising:
    generating a popularity measure for the second account based on a combination of strength of relationship values for a plurality of accounts of the messaging platform including the first account.

5. The method of claim 4, further comprising:
    generating a notification message that includes the popularity measure and providing the notification message to a user associated with the second account.

6. The method of claim 1, further comprising:
    determining a relationship recommendation in response to the setting of the value by the messaging platform, wherein the relationship recommendation includes a recommendation to create a relationship with a third account of the messaging platform; and
    providing the relationship recommendation to the client computing device for presentation to the user.

7. The method of claim 1, further comprising:
    determining a content recommendation in response to setting the value; and
    providing the content recommendation to the client computing device for presentation to the user.

8. A system comprising:
    at least one programmable processor; and
    a machine-readable medium storing instructions that, when executed by the at least one processor, cause the at least one programmable processor to perform operations comprising:
        receiving an input from a user associated with a first account of a messaging platform, wherein, in response to the received user input, the messaging platform sets a value indicating a strength of relationship from the first account to a second account;

determining, based on the value, a delivery attribute that includes one or more parameters for limiting content from the second account that is transmitted to the first account;

selecting, according to the delivery attribute, which content authored by the second account is to be included in the message stream transmitted to the first account, wherein content authored by the second account that is included in the message stream is limited;

including in the message stream transmitted to the first account no more content from the second account than the selected content; and transmitting, in response to a request received from a client computing device operating on behalf of the first account, one or more messages of the message stream, wherein the client computing device is configured to present the message stream to a user.

9. The system of claim 8, wherein the input is received as part of a request to create a connection between the first account and the second account, wherein creating the connection includes forming a graph relationship between the first account and the second account.

10. The system of claim 8, wherein the input is a selection, on an interface provided by the messaging platform, by the user of either the relationship from a plurality of relationships or the strength of relationship from a plurality of strengths.

11. The system of claim 8, wherein the operations further comprise:
generating a popularity measure for the second account based on a combination of strength of relationship values for a plurality of accounts of the messaging platform including the first account.

12. The system of claim 11, wherein the operations further comprise:
generating a notification message that includes the popularity measure and providing the notification message to a user associated with the second account.

13. The system of claim 8, wherein the operations further comprise:
determining a relationship recommendation in response to the setting of the value by the messaging platform, wherein the relationship recommendation includes a recommendation to create a relationship with a third account of the messaging platform; and
providing the relationship recommendation to the client computing device for presentation to the user.

14. The system of claim 8, wherein the operations further comprise:
determining a content recommendation in response to setting the value; and
providing the content recommendation to the client computing device for presentation to the user.

15. One or more non-transitory computer readable storage media storing computer readable program code that when executed by one or more computers causes the one or more computers to perform operations comprising:
receiving an input from a user associated with a first account of a messaging platform, wherein, in response to the received user input, the messaging platform sets a value indicating a strength of relationship from the first account to a second account;

determining, based on the value, a delivery attribute that includes one or more parameters for limiting content from the second account that is transmitted to the first account;

selecting, according to the delivery attribute, which content authored by the second account is to be included in the message stream transmitted to the first account, wherein content authored by the second account that is included in the message stream is limited;

including in the message stream transmitted to the first account no more content from the second account than the selected content; and transmitting, in response to a request received from a client computing device operating on behalf of the first account, one or more messages of the message stream, wherein the client computing device is configured to present the message stream to a user.

16. The one or more non-transitory computer readable storage media of claim 15, wherein the input is received as part of a request to create a connection between the first account and the second account, wherein creating the connection includes forming a graph relationship between the first account and the second account.

17. The one or more non-transitory computer readable storage media of claim 15, wherein the input is a selection, on an interface provided by the messaging platform, by the user of either the relationship from a plurality of relationships or the strength of relationship from a plurality of strengths.

18. The one or more non-transitory computer readable storage media of claim 15, further comprising computer readable program code that when executed causes the one or more computers to perform operations comprising:
generating a popularity measure for the second account based on a combination of strength of relationship values for a plurality of accounts of the messaging platform including the first account.

19. The one or more non-transitory computer readable storage media of claim 18, further comprising computer readable program code that when executed causes the one or more computers to perform operations comprising:
generating a notification message that includes the popularity measure and providing the notification message to a user associated with the second account.

20. The one or more non-transitory computer readable storage media of claim 15, further comprising computer readable program code that when executed causes the one or more computers to perform operations comprising:
determining a relationship recommendation in response to the setting of the value by the messaging platform, wherein the relationship recommendation includes a recommendation to create a relationship with a third account of the messaging platform; and
providing the relationship recommendation to the client computing device for presentation to the user.

21. The one or more non-transitory computer readable storage media of claim 15, further comprising computer readable program code that when executed causes the one or more computers to perform operations comprising:
determining a content recommendation in response to setting the value; and
providing the content recommendation to the client computing device for presentation to the user.

* * * * *